United States Patent
Onodera et al.

[11] Patent Number: 5,871,065
[45] Date of Patent: Feb. 16, 1999

[54] ELECTRIC POWER STEERING UNIT

[75] Inventors: Tsugio Onodera, Azuma-mura; Tadao Kodaira, Maebashi; Yoshiaki Taniguchi, Kiryu, all of Japan

[73] Assignee: Mitsuba Corporation, Gunma, Japan

[21] Appl. No.: 925,606

[22] Filed: Sep. 8, 1997

[30] Foreign Application Priority Data

Sep. 24, 1996 [JP] Japan ................................. 8-252047

[51] Int. Cl.⁶ ........................................................ B62D 5/04
[52] U.S. Cl. ................................................ 180/444; 180/443
[58] Field of Search ..................................... 180/444, 443

[56] References Cited

U.S. PATENT DOCUMENTS

| | | | |
|---|---|---|---|
| 4,766,970 | 8/1988 | Shimizu | 180/444 |
| 4,773,497 | 9/1988 | Carlson et al. | 180/444 |
| 5,685,390 | 11/1997 | Chikuma et al. | 180/444 |

*Primary Examiner*—Anne Marie Boehler
*Assistant Examiner*—Michael Cuff
*Attorney, Agent, or Firm*—McCormick, Paulding & Huber

[57] ABSTRACT

An electric power steering unit has an armature shaft that is free from axial forces and hence may have less rigorous requirements for its strength so that it may be manufactured more efficiently at reduced cost. It comprises a rack-shaft 2 to be coupled to the guiding wheels of a vehicle, a housing A for slidably containing the rack-shaft 2 and holding therein a coupling section 6 for causing the teeth of the rack-shaft 2 to engage those of a pinion arranged on the steering column 5 linked to the steering handle of the vehicle and an electric motor 1 coaxially arranged around the rack-shaft 2, which the rotary force is transmitted to the rack-shaft 2 by way of a ball screw mechanism 3 as the steering assisting power. A nut section 19 is linked to the armature shaft 11 of the electric motor 1 and rotatably supported by the housing B. The reaction force from the rack-shaft 2 generated by the inertia of the armature shaft 11 is transmitted to the housing B by way of the nut section 19 so that the armature shaft 11 is free from any axial force.

6 Claims, 6 Drawing Sheets

(PRIOR ART)

ELECTRIC POWER STEERING UNIT

BACKGROUND OF THE INVENTION

1. Field of the Invention

This invention relates to an electric power steering unit to be used for a vehicle and, more particularly, it relates to a field of technology effectively applicable to electric power steering gears to be used for rack and pinion type steering systems.

2. Related Art Statement

In recent years, most vehicles are equipped with a so-called power steering gear, and various type power steering unit, such as a hydraulically or electrically operated type power steering unit has been designed to assist the steering power of the vehicle. In these electric power steering units, as one for applicable to rack and pinion type steering systems, a unit which the steering assisting power is obtained by an electric motor arranged coaxially with a rack-shaft, as Japanese Patent Application Laid-Open No. 8-98451, is known.

Figure 6:
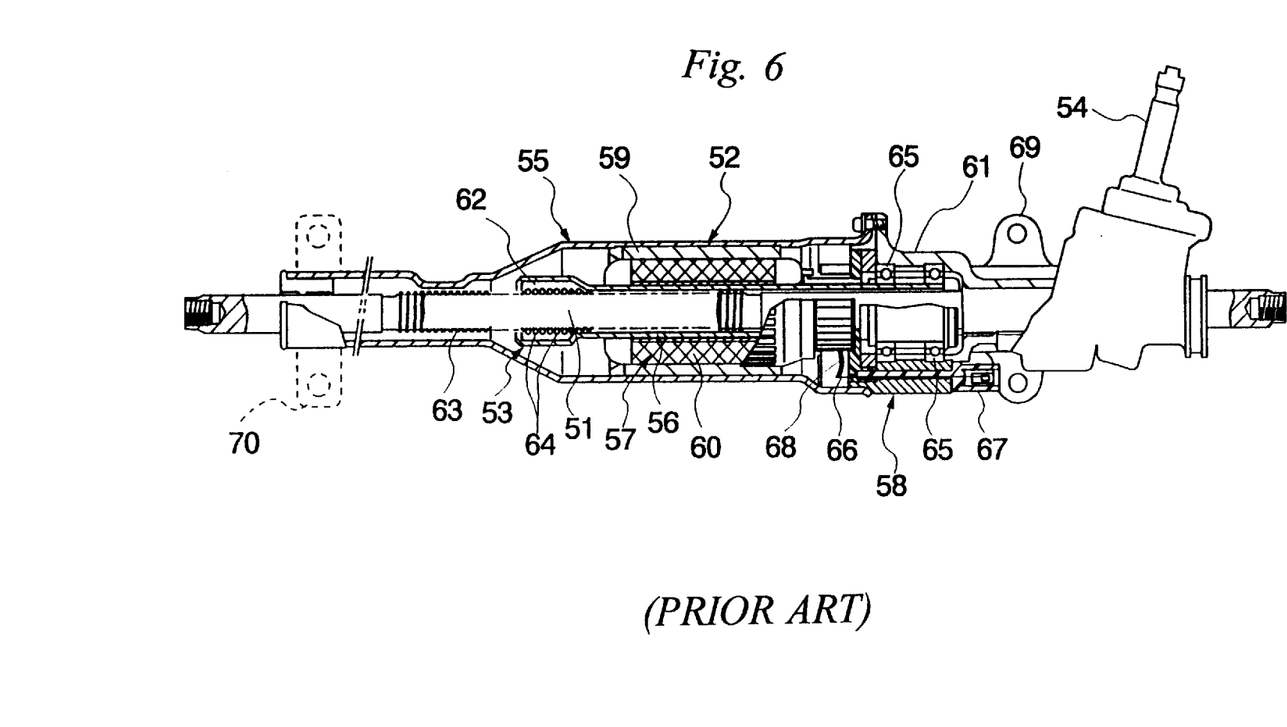
FIG. 6 is a schematic cross sectional view of a conventional power steering unit, showing its overall configuration.

Such an electric power steering unit shown in FIG. 6, comprises an electric motor 52 arranged coaxially with a rack-shaft 51 so that the steering assisting power generated by the electric motor 52 is transmitted to the rack-shaft 51 by way of a ball screw mechanism 53. Then, the guiding wheels of the vehicle can be turned by utilizing both the manual steering power of the driver and the steering assisting power.

The rack-shaft 51 is linked to the guiding wheels (which hereinafter may simply be referred to as "the wheels") typically by way of tie rods or knuckle arms arranged at the respective opposite ends thereof and also linked to the steering column 54 that is coupled to the steering wheel (which hereinafter may be referred to as "the handle") by way of a rack and pinion gear so that it may be reciprocatively moved in the horizontal directions of FIG. 6 as the steering operation by the driver. The electric motor 52 has a cylindrical yoke 55 containing coaxially therein a cylindrical armature shaft 56 and a field device 57 and is fed with power from a power supply section 58. The field device 57 comprises magnets 59 arranged on the inner peripheral portion of the yoke 55 and an armature core 60 arranged on the outer peripheral portion of the armature shaft 56. The rotary power generated by the electric motor 52 is transmitted to the rack-shaft 51 by way of a ball screw mechanism 53 arranged at the left end of the armature shaft 56 in FIG. 6. Note that the armature shaft 56 is supported at a right side portion thereof by an angular bearing 65 held within housing 61.

The ball screw mechanism 53 has a well known constitution, which comprises a large number of balls 64 arranged between a nut section 62 and a screw section 63 thereof, the nut section 62 being press-fit into and caulked against the armature shaft 56. With this arrangement, the rotary power of the electric motor 53 is transmitted to the rack-shaft 51 by way of the nut section 62, the balls 64 and the screw section 63 to produce axial reciprocative power there, which is then used to assist the steering power.

A power steering unit having the above described configuration is then mounted to the vehicle by securely fitting the housing 61 and the yoke 55 on the right side of FIG. 6 to the vehicle main body. More specifically, the housing 61 is secured to the vehicle by screw engagement by way of a fitting section 69 integrally formed with it. On the other hand, the yoke 55 is fitted to the vehicle by holding the pipe-shaped end (on the left side in FIG. 6) of the yoke 55 under a bracket 70 having a U-shaped cross section at a middle portion thereof. Note that an elastic member (not shown) typically made of rubber is arranged around the pipe-shaped end with a small diameter of the yoke 55 so that the yoke 55 is held under the U-shaped area of the bracket 70 with the elastic member disposed therebetween.

Now, the wheels may be turned to extremes during a servicing operation or when the steering wheel is turned while the vehicle is standing still. Then, some of the stoppers (not shown) of the tie rods provided at the both ends of the rack-shaft 51 may abut the corresponding end of the housing 61 and the yoke 55 to resist the turning motion of the wheels. Under this condition, the housing 61 and the yoke 55 are subjected to a large impact that can exceed several tons as a result of the abutment. Particularly, the vehicle maybe jacked up during a servicing operation and driven to run seemingly at a very high speed that can not be achieved under any ordinary driving conditions. Since each of the related members of the vehicle is subjected to a very large power in such a case, they are normally designed to bear an impact as large as ten tons.

Meanwhile, as some of the stoppers abut the corresponding end of the housing, the rotating part of the armature shaft 56 is also stopped and the rack-shaft 51 is subjected to a large impact due to the force of inertia. Thus, the armature shaft 56 is also subjected to a reaction force exerted by the ball mechanism 53.

If the power transmission path is looked into in such a case, it will be found that, when a stopper hits the left side end of the yoke 55 in FIG. 6, the yoke 55 is firstly and directly subjected to a compressive force. On the part of the electric motor 52, on the other hand, it then exerts the force of inertia onto the rack-shaft 51, trying to move further to the right relative to the rack-shaft 51 and the armature shaft 56 is consequently subjected to a tensile force, which is the reaction force exerted to it by the rack-shaft 51. This tensile force is then transmitted back to the stopper by way of the angular bearing 65, the housing 61 and the yoke 55.

When another stopper hits the right side end of housing 61 in FIG. 6, the housing 61 is directly subjected to a compressive force. On the other hand, the rack-shaft 51 is subjected to a force trying to move it further left due to the force of inertia of the electric motor 52 and the armature shaft 56 is consequently subjected to a compressive force, which is the reaction force exerted to it by the rack-shaft 51. This compressive force is then transmitted back to the stopper by way of the angular bearing 65 and the housing 61.

As described above, the armature shaft 56 of conventional power steering units is required to have a strength that can sufficiently make it withstand severe operating conditions because not only the housing 61 and the yoke 55 but also the armature shaft 56 are subjected to large tensile and compressive forces in operation. Thus, it has to have a large thickness and be made of a material highly resistant to external forces to consequently reduce its manufacturing efficiency and raise its manufacturing cost.

Additionally, as shown in FIG. 6, the yoke 55 and the armature shaft 56 have very complicated respective profiles that pose on them highly sophisticated requirements in terms of the material, the manufacturing process and the processing precision to make them have a satisfactory strength. Consequently, the cost of manufacturing such an armature shaft and a yoke will have to be further raised.

An object of the present invention is to provide an electric power steering unit having an armature shaft that is free from axial forces and hence may have less rigorous requirements for its strength so that it may be manufactured more efficiently at reduced cost.

Another object of the present invention is to provide an electric power steering unit having an armature shaft and a yoke having simplified respective profiles that pose on them less sophisticated requirements in terms of the material, the manufacturing process and the processing precision to make them show a satisfactory strength so that such an armature shaft and a yoke may be manufactured at reduced cost.

The above-described and other objects, and novel feature of the present invention will become apparent more fully from the description of the following specification in conjunction with the accompanying drawings.

SUMMARY OF THE INVENTION

According to the invention, there is provided an electric power steering unit comprising a rack-shaft to be coupled to the guiding wheels of a vehicle, a first housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering. And the unit further comprises a second housing for rotatably supporting the nut section of the ball screw mechanism in such a way that the reaction force from the rack-shaft, generated by the inertia of the armature shaft, is transmitted to the second housing by way of the nut section and the armature shaft is not subjected to any axial force.

DESCRIPTION OF THE PREFERRED EMBODIMENT

Figure 1:
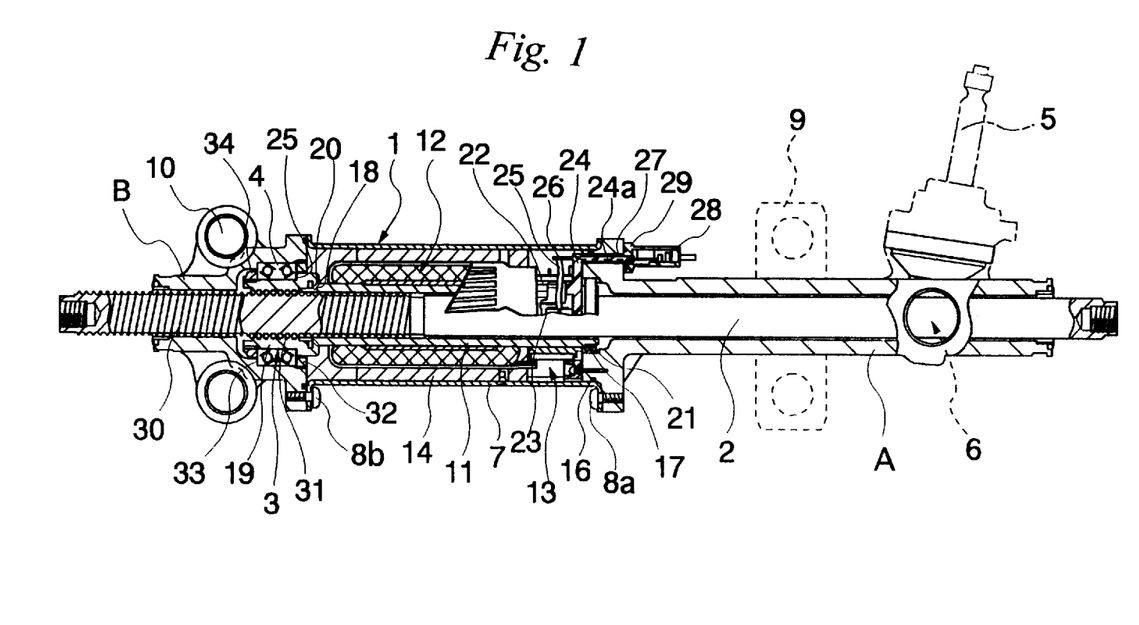
FIG. 1 is a schematic cross sectional view of an embodiment of power steering unit according to the invention, showing its overall configuration.
Figure 2:
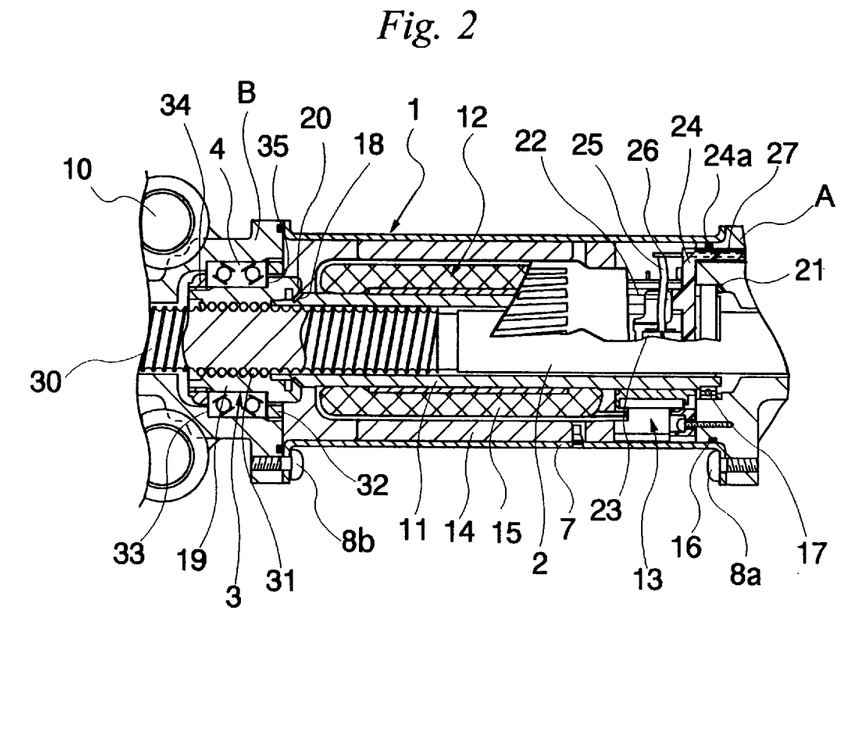
FIG. 2 is an enlarged cross sectional partial view of the embodiment of power steering unit of FIG. 1, showing its principal area.

Now, the invention will be described in greater detail by referring to the accompanying drawings that illustrate preferred embodiments of the invention. FIG. 1 is a schematic cross sectional view of an embodiment of electric power steering unit according to the invention, showing its overall configuration. FIG. 2 is an enlarged cross sectional partial view of the embodiment of power steering unit of FIG. 1, showing its principal area.

As seen from FIGS. 1 and 2, the electric power steering unit (hereinafter referred to as "power steering unit") is provided with an electric motor 1 having a hollow central area and arranged around a rack-shaft 2 as in the case of the conventional power steering units shown in FIG. 6 and, for example, the unit is fitted to the steering gear of the wheels of a vehicle that are typically the front wheels. The steering assisting power generated by the electric motor 1 is transmitted to the rack-shaft 2 via a ball screw mechanism 3 to reduce the physical load for steering the vehicle on the part of the driver.

As shown in FIG. 1, the power steering unit further comprises a housing A (first housing) and a housing B (second housing), which are securely coupled to yoke 7 of the electric motor 1 by means of a plurality of respective screws 8*a* and 8*b*, and the rack-shaft 2 is arranged in them in such a way that it may be moved to the right and the left direction in FIG. 1. Then, the power steering unit 1 is fitted to the vehicle main body by means of a bracket 9 and fitting holes 10 of the housing B and, at the same time, the wheels are linked to the respective ends of the rack-shaft 2 by means of tie rods or knuckle arms.

The housing A is a hollow member typically made of cast iron or die-cast aluminum and fitted to the vehicle main body by means of the bracket 9 with an elastic member typically made of rubber and interposed therebetween. A coupling section 6 is arranged at the right side end of the unit in FIG. 1 for coupling the rack-shaft 2 with the steering column 5 of the vehicle that is further linked to the steering wheel. In this coupling section 6, a pinion (not shown) arranged on the steering column 5 and the teeth of a rack arranged on the outer side portion of the rack-shaft 2 are engaged with each other so that the rotary motion of the steering column 5 is converted into a reciprocative motion of the rack-shaft 2 that moves right and left direction in FIG. 1. A torque sensor (not shown) is arranged on the coupling section 6 to detect the torque of the steering column 5 so that the power output of the electric motor 1 may be controlled as a function of the detected torque.

The electric motor 1 has a cylindrical yoke 7 containing coaxially therein a cylindrical armature shaft 11 and a field device 12. The rack-shaft 2 is assembled to run through the inside of the armature shaft 11 and has a simplified profile if compared with its counterpart of the conventional unit in FIG. 6.

The field device 12 comprises a plurality of magnets 14 arranged on the inner peripheral surface of the yoke 7 and an armature core 15 arranged on the outer peripheral portion of the armature shaft 11 and is fed with electric power from a power supply section 13.

The yoke 7 is a hollow and cylindrical member made of iron and having a profile of a cylindrical pipe with a substantially constant thickness. It contains therein the field device 12 and the power supply section 13. The yoke 7 is securely and airtightly connected to the housing A at the right side end thereof in FIG. 1 by means of a plurality of screws 8*a* and an O-ring 16. On the other hand, it is securely connected to the housing B at the left side end in FIG. 1 also by means of a plurality of screws 8*b*.

The magnets 14 of the field device 12 operates as field poles and are arranged peripherally at regular intervals in the yoke 7. On the other hand, the armature shaft 11 is held at an end thereof (the right side end in FIGS. 1 and 2) by a bearing 17 fitted to the housing A and provided on the other end (the left side end in FIGS. 1 and 2) with a tapered spline 18, which is engaged with a corresponding spline 20 formed at an end of a nut section 19 of the ball-and-screw mechanism 3 so that the rotary motion of the armature shaft 11 is transmitted to the nut section 19.

Note that a rubber member 21 is fitted to a right side portion of the bearing 17 to urge the armature shaft 11 against the side of the nut section 19 by means of the elastic force of the rubber member 21. Thus, the spline 18 is urged against and engaged with the spline 20 so that the rotary motion of the armature shaft 11 is securely transmitted to the nut section 19. Because of the rubber member 21 arranged on the right side of the bearing 17, the armature shaft 11 is held in position but allowed to move to a small extent. Note that the rubber member 21 can be replaced by an equivalent member that may be made of any appropriate material and have any contour so long as it axially urges the armature shaft 11. For example, it may be replaced by a coned disc spring, a wave washer or a member made of synthetic resin.

The power supply section 13 is designed to feed the armature with electricity and comprises a commutator 22 rigidly secured to the armature shaft 11 and a brush 23 held in contact with the peripheral surface of the commutator 22 to provide electric contact points between them. The brush 23 is held in a brush holder formed integrally with a brush holder stay 24 that is made of synthetic resin and pressed against the commutator 22 under a predetermined pressure by means of an elastic member (not shown). On the other hand, a terminal plate 26 having an end connected to a pig tail 25 of the brush 23 by spot welding is made to run through a projecting section 24a of the brush holder stay 24 by means of an insertion molding technique. Then, the brush holder stay 24 is secured to the housing A with screws in such a way that the front end of the projecting section 24a is projecting to the outside through a hole 27 of the housing A. Thus, the terminal plate 26 projects from the housing A with the projecting section 24a of the brush holder stay 24 to form a power supply terminal.

Figure 3:
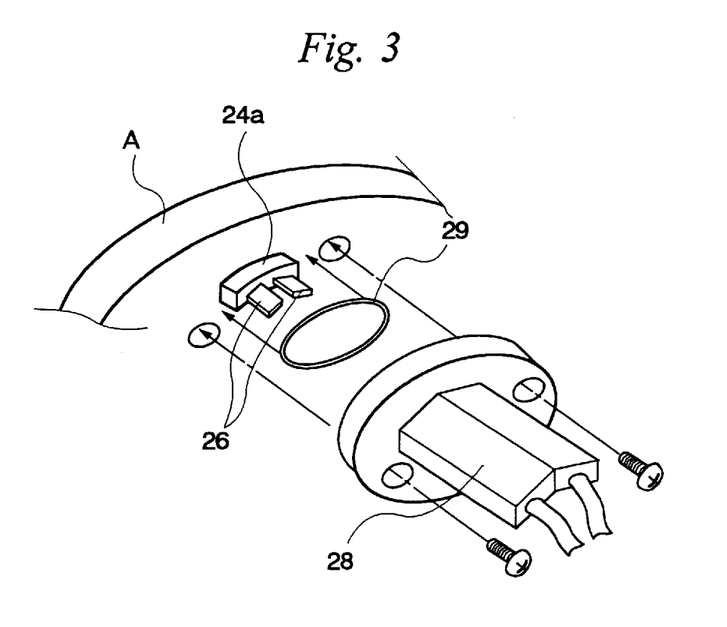
FIG. 3 is a schematic perspective view of the power supply terminal of the embodiment of FIG. 1, illustrating how a coupler is fitted thereto.

FIG. 3 is a schematic perspective view of the power supply terminal, illustrating how a coupler 28 is fitted thereto. Referring to FIG. 3, the terminal plate 26 projects to the outside of the housing A with the projecting section 24a to provide a male terminal and a waterproof female coupler 28 is secured to it by means of screws with an 0-ring 29 interposed therebetween. It should be noted here that any interruption to the supply of power to the electric motor 1, if instantaneous, is not allowed from the viewpoint of assisting the manual power applied to the steering wheel by the driver for maneuvering the vehicle. Since the coupler 28 is rigidly secured to the housing A by means of screws in this embodiment of power steering unit, the coupler 28 is prevented from being unfastened to get out of power supply due to vibrations to improve the reliability of the unit.

Meanwhile, in the conventional power steering unit, the terminal is secured to the housing 61 by inserting a coupler 67 (male side) formed integrally with the terminal 66 and rigidly securing an end of the terminal 66 to a pig tail 68 of the brush as shown in FIG. 6. With this arrangement of the conventional power steering unit, the terminal 66 and the pig tail 68 are connected to each other after by spot welding after fitting the coupler 67 to the housing 61. Therefore, with the conventional power steering unit, the welding operation has to be carried out by rigidly anchoring the relatively large housing 61 and it makes the operation rather cumbersome. Additionally, since the coupler 67 is not adapted to disassembling, either the housing 61 has to be replaced or the pig tail 68 and the terminal 66 have to be cut off from each other to replace the brush. In the latter case, the new brush has to be connected to the pig tail by spot welding for another time.

This embodiment employs a terminal configured in a manner as described above, thus, in this embodiment, the brush holder stay 24 and the pig tail 25 are connected with each other by spot welding so that they may collectively be handled efficiently as a subassembly. Additionally, they can be easily separated from the housing A so that only the brush holder stay 24 have to be replaced when the brush 23 is replaced. Thus, the number of components that have to be replaced for maintenance and consequently the efficiency of maintenance operation is significantly improved. Still additionally, the coupler 67 of the conventional power steering unit is omitted from this embodiment to reduce the total number of components to reduce the manufacturing cost.

The housing B is, like the housing A, a hollow member typically made of cast iron or die-cast aluminum and provided in the inside with a ball-and-screw mechanism 3. The ball-and-screw mechanism 3 per se is known and comprises a nut section 19, a screw section 30 formed on the outer peripheral wall of the rack-shaft 2 and a number of balls 31 arranged between the nut section 19 and the screw section 30. The rack-shaft 2 is supported by the nut section 19 in such a way that its rotary motion around the axis of rotation is restricted but it is reciprocated right and left direction in FIG. 1 as the nut section 19 is rotated.

The nut section 19 is axially rotatable relative to the housing B with an angular bearing 4 interposed therebetween and securely fitted to the housing B. Thus, unlike the conventional power steering unit of FIG. 6 wherein the nut section of the ball-and-screw mechanism and the angular bearing are independently arranged, the nut section 19 of the ball-and-screw mechanism 3 and the angular bearing 4 are combined to form a unitary member and arranged in the housing B that is separated from the housing A in this embodiment of power steering unit according to the invention. The angular bearing 4 is securely held between a bearing holder ring 32 screwed into an opening of the housing B and a stepped section 33 formed in the housing B to restrict its axial movement. The relative axial movement of the nut section 19 and the angular bearing 4 is restricted by another bearing holder ring 34 screwed into the left end of the nut section 19 and another stepped section 35 formed on the outer peripheral wall of the nut section 19.

On the other hand, a tapered spline 20 is formed at the right end of the inner cylindrical space of the nut section 19 and engaged with a corresponding spline 18 of the armature shaft 11. Thus, the armature shaft 11 and the nut section 19 are coupled firmly so that they can be handled as a unitary member. More specifically, the armature shaft 11 is supported by the bearing 17 and the nut section 19 and the rotary motion of the armature shaft 11 is effectively transmitted to the nut section 19. Therefore, as the armature shaft 11 rotates, the nut section 19 is rotated accordingly to reciprocatively move the rack-shaft 2 right and left direction under the effect of the ball-and-screw mechanism 3.

Note, since the rack-shaft 2 is bent by the external force typically applied to it by the wheels, a clearance considering the quantity of the bending has to be provided between the rack-shaft 2 and the armature shaft 11. Conventionally, the relationship between the quantity of the bending and the points where the rack-shaft 2 is supported is not considered and the supporting points are arbitrarily selected. As a result, the clearance has to be made excessively large to accommodate any possible bending of the rack-shaft 2 and baffle any attempt to down-size the unit. To the contrary, in view of the fact that the rack-shaft 2 is supported at two points of the ball-and-screw mechanism 3 and the coupling section 6, the bending of the rack-shaft 2 is minimized by equalizing the distances from the opposite ends of the rack-shaft 2 to the respective supporting points in this embodiment of power steering unit, provided that the rack-shaft 2 shows a same rigidity at the two supporting points. If the rack-shaft 2 shows different rigidity values at the two supporting points, the bending of the rack-shaft 2 can be minimized by appropriately selecting the supporting points, taking the ratio of the rigidity values into consideration. The clearance between the rack-shaft 2 and the armature shaft 11 can be minimized by minimizing the bending of the rack-shaft 2 to reduce the overall dimensions and hence the manufacturing cost of the unit.

Now, the embodiment of power steering unit of the invention operates in a manner as described below. Firstly, as the steering wheel is operated by the driver to turn the steering column 5 and the rack-shaft 2 is moved in the direction corresponding to the sense of rotation of the steering column 5 to carry out a necessary steering operation. At the same time, a steering torque sensor (not shown) detects the torque generated by the rotary motion of the steering column 5 and consequently the commutator 22 is supplied with electric power corresponding to the detected torque from the terminal plate 26 having the coupler 28 via the brush 23. As the electric motor 1 is driven to operate the armature shaft 11 and hence the nut section 19 coupled to it are rotated. As the nut section 19 rotates, the steering assisting power is transmitted to the rack-shaft 2 under the effect of the ball-and-screw mechanism 3, whereby the movement of the rack-shaft 2 is promoted and the steering power is assisted.

Figure 4:
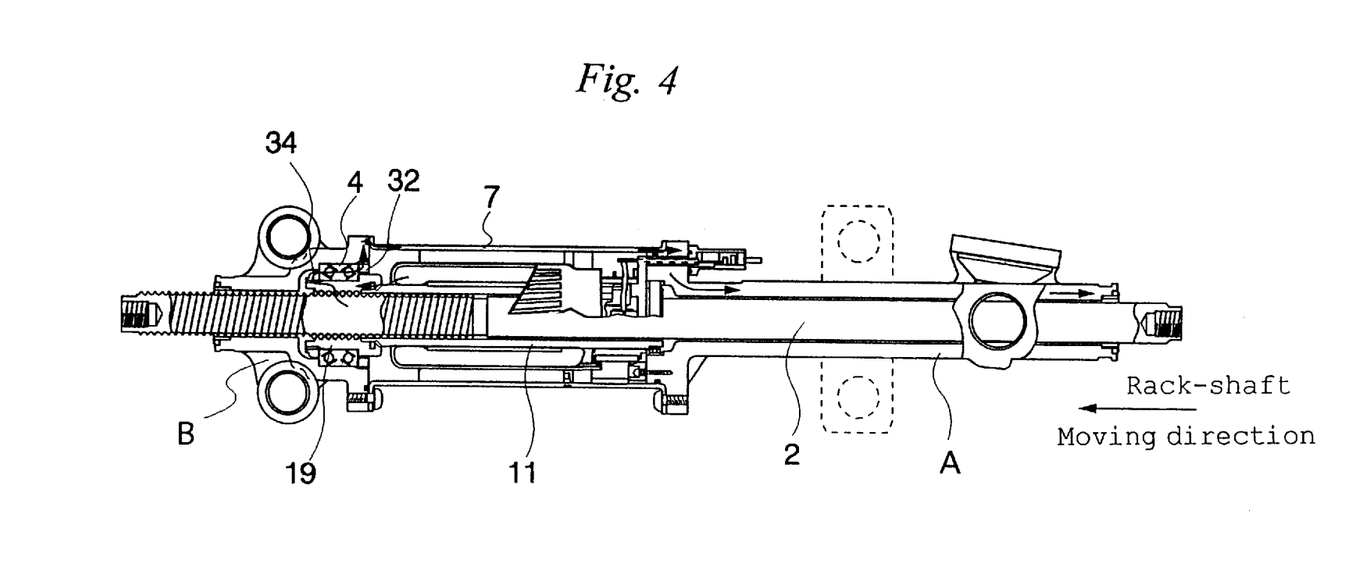
FIG. 4 is a schematic cross sectional view of the embodiment of FIG. 1, illustrating the power transmission path that appears when the stopper arranged at the right end of the rack-shaft abuts the housing.
Figure 5:
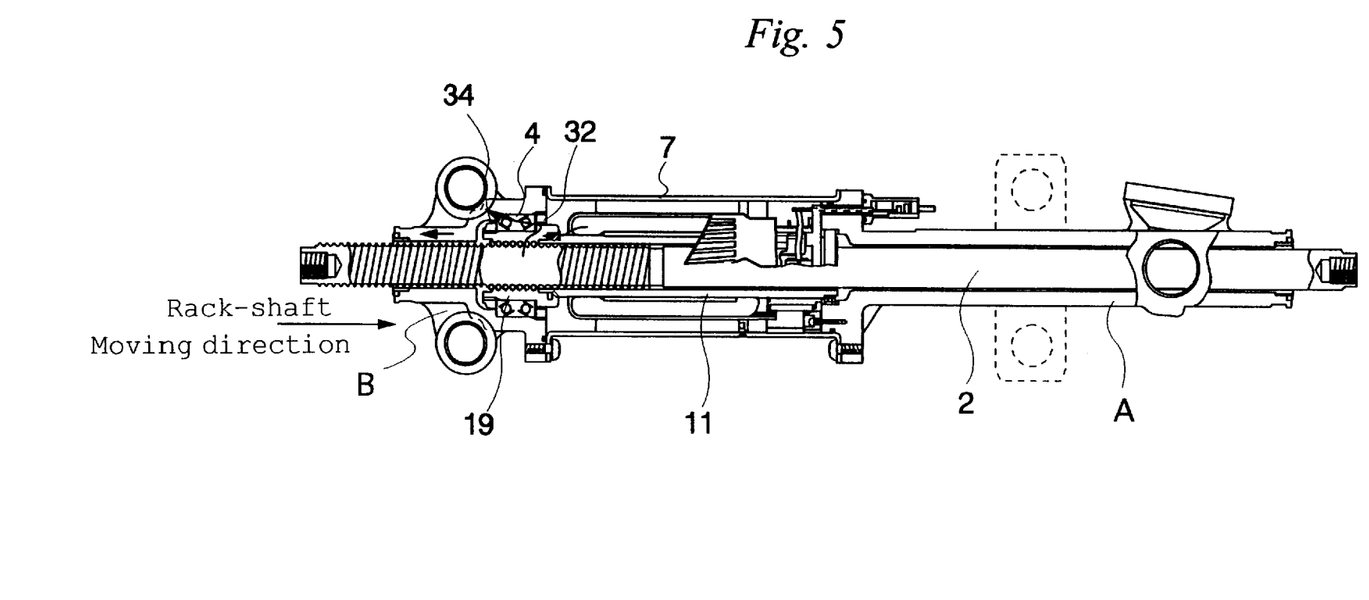
FIG. 5 is a schematic cross sectional view of the embodiment of FIG. 1, illustrating the power transmission path that appears when the stopper arranged at the left end of the rack-shaft abut the housing.

Next, as the wheels are turned to an extreme, a force is generated by the inertia of the armature shaft 11 of the embodiment as will be described below. FIG. 4 illustrates how the generated force is transmitted when the rack-shaft 2 is moved to the left in FIG. 4 and the stopper (not shown) arranged on the right side of the rack-shaft 2 comes to abut the housing A. On the other hand, FIG. 5 illustrates the transmission path of the force when the rack-shaft 2 is moved to the right in FIG. 5. Note that no hatching is used to show the cross section of the components shown in FIGS. 4 and 5 in order to make the transmission path of the force easily visible and understandable.

As described earlier by referring to a conventional power steering unit, when the wheels of the vehicle provided with such a unit are turned to an extreme, the stoppers of the tie rods fitted to the rack-shaft 2 abut the housings A and B respectively so that the housings A and B are subjected directly to compressive force. On the other hand, as the armature shaft 11 is stopped abruptly, the nut section 19 coupled to the armature shaft 11 is also subjected to the force of inertia and cannot get rid of it as long as the armature shaft 11 is there and rotates. In view of this problem, the embodiment of power steering unit of the invention is so configured that, when a load is produced by the inertia of the armature shaft 11, the latter is not subjected to any axial force due to the load so that it may meet less rigorous requirements in terms of strength. Now, the load generated by the inertia of the armature shaft 11 will be described by referring to FIGS. 4 and 5.

Referring firstly to FIG. 4, assume that the rack-shaft 2 is moved leftward and then halted by the stopper there. Then, the armature shaft 11 is halted at the same time but rotary force trying to keep on rotating the nut section 19 before the halt is generated by the inertia, that is, the force tending to move the rack-shaft 2 further left is generated. However, since the movement of the rack-shaft 2 is checked by the stopper and it cannot move leftward any further. Consequently, the rack-shaft 2 generates a corresponding reaction force in the nut section 19, which is then transmitted to the housing B by way of the bearing holder ring 34, the angular bearing 4 and the bearing holder ring 32. Then, this force tends to compress the yoke 7, which by turn transmits it to the housing A and returned to the stopper.

Now, referring to FIG. 5, assume that the rack-shaft 2 is moved rightward and then halted by the stopper there. As in the case of FIG. 4, the force tending to move the rack-shaft 2 further right is generated by the inertia of the armature shaft 11 and consequently a corresponding reaction force is generated in the nut section 19 and transmitted to the housing B by way of the stepped section 35, the angular bearing 4 and the stepped section 33, then the force is returned to the stopper.

Thus, the force generated by the inertia of the armature shaft 11 is always returned to the related stopper by way of the angular bearing 4 and the housing B so that the armature shaft 11 is subjected only to rotary force. Therefore, unlike the armature shaft 11 of the conventional power steering units, the armature shaft 11 of this embodiment is free from tensile or compressive force so that it may meet less rigorous requirements in terms of strength and hence material and thickness can be designed and manufactured on the eased condition, therefore, it is possible to lower the cost and to improve the efficiency of manufacturing.

Additionally, it will be understood by comparing FIGS. 1 and 2 with FIG. 6 that the armature shaft and the yoke of this embodiment have very simplified respective profiles. More specifically, the armature shaft 11 does not have any neck-like section and have a reduced length, a fact that can remarkably reduce the manufacturing cost of the armature shaft 11 along with the less rigorous requirements to be met for the strength as described above. Still additionally, since the inertia of the armature shaft is reduced, it is possible to ease the impact force when the wheels are turned to the extremes and to improve the response speed.

Further, the yoke 55 of FIG. 6 has a neck-like section that is disadvantageous from the viewpoint of designing, manufacturing and cost because the yoke is subjected to compressive force in operation and the neck-like section is weak. To the contrary, the yoke 7 of this embodiment of power steering unit of the invention has a simple hollow cylindrical profile and hence is more resistant against compressive force to make it advantageous over the counterpart of the conventional unit particularly in terms of manufacturing cost.

Detailed description has hereinabove been given of the invention achieved by the present inventor with reference to the embodiment. However, the present invention should not be limited to the embodiment described above, and may be variously modified within the scope not departing from the gist.

For instance, a brushless electric motor may be used for an power steering unit according to the invention. If such is the case, the field device has a core and magnets respectively arranged on the yoke side and the armature shaft side while the power supply section has a circuit board comprising conducting means and a detector for detecting the angular position of the armature shaft. Additionally, the present invention is applicable not only to front wheels steering unit but also to rear wheels steering unit having the same constitution and mounting condition as the front wheels steering unit.

While the housings A and B are rigidly secured to the vehicle main body respectively by means of a bracket 9 and fitting holes of the housing B in the above embodiment, the housing B may be secured to the main body by means of a bracket and the housing A may be provided with fitting holes for securing it to the main body.

Finally, while the present invention is described particularly in terms of power steering unit of motor vehicle, it may be applied to any industrial machines and vehicles provided with a steering system.

The advantages of the present invention may be summarized as follows.

Since the housing B (second housing) is rotatably supported the nut section of the ball-and-screw mechanism in the state of linking the nut section to the armature shaft of the electric motor, the reaction force from the rack-shaft generated by the inertia of the armature shaft is transmitted to the housing B and the armature shaft is left free from any axial force. Thus, the armature shaft is only subjected to rotary force and hence may have less rigorous requirements for its strength. Consequently, it may meet less rigorous requirements in terms of strength and hence material and thickness can be designed and manufactured on the eased condition, therefore, it is possible to improve the efficiency of manufacturing and to lower the cost of the unit.

What is claimed is:

1. An electric power steering unit comprising a rack-shaft to be coupled to the guiding wheels of a vehicle, a first housing for slidably containing the rack-shaft and holding therein a coupling section for causing the teeth of the rack-shaft to engage those of a pinion arranged on the steering column linked to the steering handle of the vehicle, an electric motor coaxially arranged around the rack-shaft to supply assisting power to the rack-shaft and a ball screw mechanism for connecting a nut section linked to the armature shaft of the electric motor with a screw section formed on the rack-shaft by disposing ball members therebetween and for transmitting the rotary power of the electric motor to the rack-shaft as assisting power for steering, characterized by:

said steering unit further comprising a second housing for rotatably supporting said nut section and for axially holding said nut section to restrict axial movement of said nut section relative to said second housing, and means rotatably drivingly connecting said armature shaft to said nut section so as to transmit rotary motion of said armature shaft to said nut section while allowing said nut section to move axially relative to said armature shaft in both axial directions sufficiently so that when said nut section is urged by an axial force in either axial direction, movement of said nut section is arrested and the force is reacted by said second housing before said nut section reaches its limit of axial movement relative to said armature shaft so that said armature shaft is not subjected to any of said axial force.

2. An electric power steering unit according to claim 1, further characterized in that:

said nut section is axially held by said second housing through an angular bearing securely axially fitted to said second housing.

3. An electric power steering unit according to claim 2, further characterized in that:

the movement of said nut section and said angular bearing axially relative to one another is restricted by a bearing holder ring fitted on the end of said nut section and by a stepped section formed on the outer peripheral wall of said nut section with said angular bearing being located on said nut section between said holder ring and said stepped section.

4. An electric power steering unit according to claim 2, further characterized in that:

said angular bearing is securely held against axial movement relative to said second housing by being held between a bearing holder ring fitted in an opening of said second housing and a stepped section formed in said second housing.

5. An electric power steering unit according to claim 1, further characterized in that:

said nut section is rotatably drivingly connected with said armature shaft by coengaging axially extending first spline means on said nut section and axially extending second spline means on said armature shaft, said first and second spline means being axially movable relative to one another.

6. An electric power steering unit according to claim 5, characterized in that:

said first spline means includes a tapered spline at one end of said nut section and said second spline means includes a correspondingly tapered spline at an adjacent end of said armature shaft, said nut section and said armature shaft being drivingly rotatably coupled by coengagement of said splines.

* * * * *